June 18, 1940.   P. C. BOOTY, JR   2,204,655
DEVICE FOR ASSEMBLING BALL BEARINGS
Filed Jan. 30, 1937   2 Sheets-Sheet 1
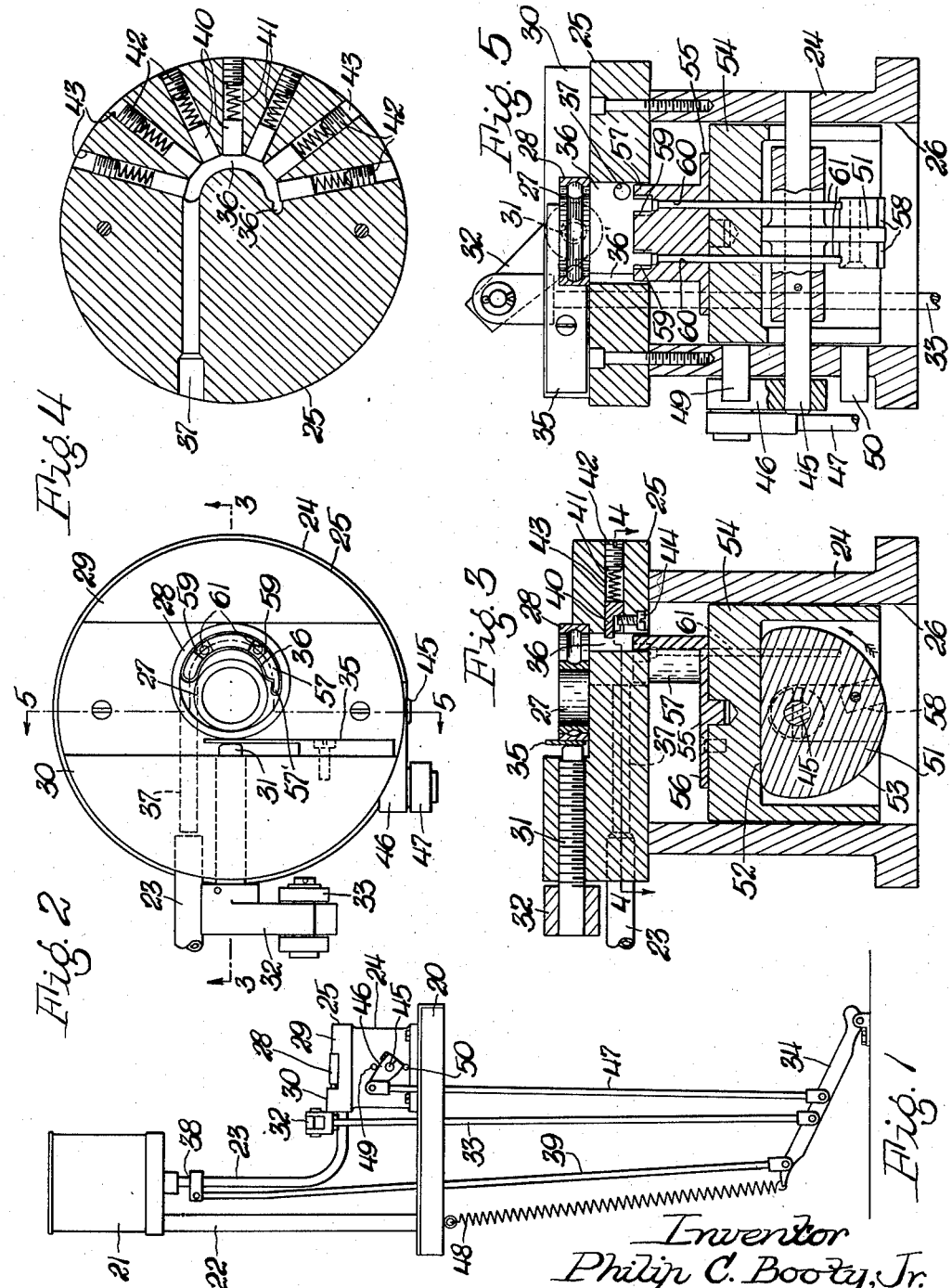
Inventor
Philip C. Booty, Jr.
By V. F. Larraque  Atty June 18, 1940.   P. C. BOOTY, JR   2,204,655
DEVICE FOR ASSEMBLING BALL BEARINGS
Filed Jan. 30, 1937   2 Sheets-Sheet 2
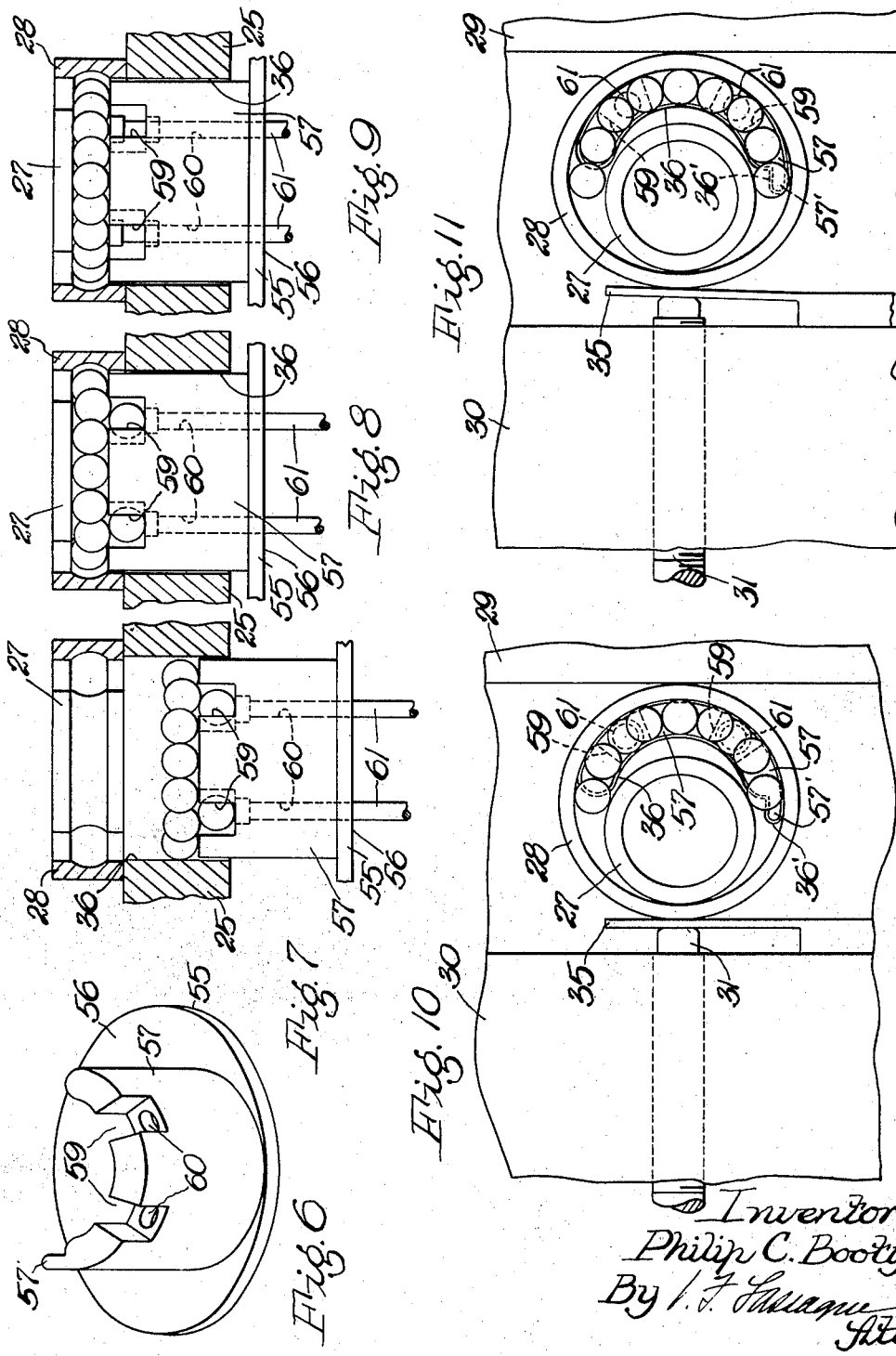
Inventor
Philip C. Booty, Jr.
By /.../
Atty.

Patented June 18, 1940

2,204,655

UNITED STATES PATENT OFFICE 2,204,655

DEVICE FOR ASSEMBLING BALL BEARINGS

Philip C. Booty, Jr., Chicago, Ill., assignor to International Harvester Company, a corporation of New Jersey Application January 30, 1937, Serial No. 123,113

20 Claims. (Cl. 29—84)

This invention relates to a machine for assembling anti-friction bearings of the ball bearing annular type, and more particularly to means for introducing a predetermined number of balls between the race rings of an annular bearing.

Heretofore, in loading balls into bearings, it was necessary to load by hand or other simple means as many balls as possible between the race rings. Additional balls required to partially complete the assembly had to be introduced between the race rings by hand or simple means of forcing into the ball group from above while the rings were supported on a plate or table.

A principal object of the invention is to provide means for quickly and easily introducing the balls between the race rings.

Another principal object of the invention, therefore, is to provide means for introducing a predetermined number of additional balls between the race rings.

Another object of the invention is to provide means for supporting and holding the race rings in the machine in such a manner as will allow the quick and easy accomplishment of the above objects.

An important object is to provide means for temporarily distorting one of the race rings in such a manner as will alter the shape of the space between the rings to permit easy introduction of additional balls.

Still another object is to provide an opening in the race ring supporting means to which balls may be supplied that will best cooperate with the space between the race rings and the means for introducing balls thereto.

Another object is to provide ball retaining means in the race ring supporting means.

Still another object is to provide means for controlling the race ring distorting means, ball supplying means and the ball introducing means.

Briefly, these and other important objects are accomplished by the preferred embodiments of the machine and means as hereinafter disclosed in which generally a support is provided to support the inner and outer races of a bearing, means being provided on the support for temporarily distorting the outer race ring while balls are introduced into the space between the race rings. The machine and means as above disclosed are described in detail and shown in the accompanying sheets of drawings, in which:

Figure 1 is a side elevational view of the machine illustrating its adaptation in conjunction with a conventional type of ball magazine and assembly table or the like;

Figure 2 is an enlarged plan view of the bearing assembling structure showing the race rings of a bearing in position thereon;

Figure 3 is a vertical sectional view of the same taken on the line 3—3 of Figure 2;

Figure 4 is a horizontal sectional view of the plate as taken along the section line 4—4 of Figure 3, showing the opening therein and the resilient ball retaining means;

Figure 5 is a vertical sectional view similar to Figure 3 but revolved 90° as indicated by the section line 5—5 of Figure 2;

Figure 6 is a perspective detail view of part of the ball introducing means;

Figures 7, 8 and 9 are enlarged fragmentary views of certain parts of the structure showing progressively the introduction of balls between the race rings; and, Figures 10 and 11 are fragmentary plan elevational views illustrating the compressing means and the outer race ring being temporarily distorted.

In a preferred embodiment of the invention, as illustrated, the bearing assembling machine is shown as being mounted on an assembly table or bench 20 which may be supported along a wall or on any other support as is conventional. A ball container or magazine 21 is supported on the table 20 through the medium of a column or standard 22 and is provided with ball supplying means in the form of a conduit 23.

The supporting means for supporting the races of the bearing comprises a base 24, preferably cylindrical in cross section, and a plate 25 secured thereto. As best shown in Figures 3 and 5, the base 24 is provided with an axial bore 26. The supporting means is carried on the table 20 in any suitable manner.

As best shown in Figures 1, 2 and 3, the plate 25 is adapted to support the inner and outer race rings of a ball bearing, the races being indicated at 27 and 28 respectively. Further, as best shown in Figures 2, 10 and 11 the races 27 and 28 are positioned on the plate 25 with the inner race 27 eccentrically within the outer race 28, leaving a space therebetween for a purpose to be later described. The plate 25 is provided with a means for temporarily distorting or compressing the outer race ring. This compressing means comprises an abutment or raised portion 29 on the plate 25, and a means movably carried by the plate 25 in a somewhat similar raised portion 30. The raised portion 30 is positioned substantially diametrically opposite the abutment 29. The means movably carried thereby comprises preferably a horizontal screw 31. A lever arm 32 nonrotatably carried at the outer end of the screw 31 is connected by a link or rod 33 which extends through the table 20 and therebelow where it is operatively connected to an actuating means in the form of a foot treadle 34.

Looking again to Figures 2, 10 and 11 a resilient member 35 is rigidly carried on the raised portion 30 of the plate 25, and is adapted to abut the periphery of the outer race ring 28 at a point substantially diametrically opposite to the point of tangency of the periphery of the outer race ring 28 and the abutment 29 on the plate 25. The inner end of the screw 31 abuts the opposite side of the member 35. Further, the screw 31 operates on a horizontal line which may be considered an extension of a diameter of the outer race ring 28 drawn through the points of tangency between the race ring and the resilient member 35 and the abutment 29. As will be noted from further examination of Figures 2, 10 and 11, the land of the inner race ring 27 is tangent to the land of the outer race ring at a point lying on this line. It has been found that best results are obtainable by positioning the parts as above described and illustrated, although it is obvious that any other positioning and compressing or distorting means could be used that would be somewhat similar even though less desirable.

It will be apparent that the means for temporarily distorting the outer race ring forms in effect a vise-like device and that the resilient member 35 serves as a means to protect the outside diameter of the outer race ring 28 from injury by the screw 31.

It will also be apparent from the disclosure thus far that the plate for supporting the race rings is peculiar to those race rings; that is, the distance between the inner faces of the abutment 29 and the resilient member 35 is adapted to a race ring of a certain outside diameter. And, further, it will be understood that the means and construction hereinafter described are provided especially for a certain size bearing requiring a certain number of balls to complete the assembly thereof, and it is obvious that similar machines may be provided for bearings of different size.

As best shown in Figures 2 and 4, the plate 25 is provided with an arcuate opening 36 concentric with the outer race ring 28 for a purpose to appear later. The arcuate opening 36 is provided with a tail portion 36' for a purpose to appear in the description of the operation of the machine. A horizontal bore or passage 37 is provided in the plate 25 and communicates at one end with the arcuate opening 36 and at the other end with the ball supplying means or conduit 23. By this means balls are supplied from the magazine 21 to the arcuate opening 36, said opening consequently providing a pocket or receiver for accommodating a certain number of balls, as will be later described. A control or ball agitating means of conventional construction is provided as at 38 and is connected by a link or rod 39 which extends downwardly through the table 20 and is operatively connected to the treadle 34.

As best shown in Figures 3 and 4, the plate is further provided with a plurality of resilient ball retaining means which comprise cylindrical plungers 40, compression springs 41 and adjustable set screws 42 operable in bores 43 radially extending from the center of the arcuate opening 36. As best shown in Figure 3, a vertical stud 44 extends into each bore 43 and cooperates with a notch in each plunger 40 for the purpose of providing a stop therefor. The plungers 40 partially enter the arcuate opening 36 above the ball supplying bore 37 and their ends form substantially a continuous line for a purpose to appear presently. It is understood that the compression of the springs 41 on the plungers 40 may be adjusted by means of the screws 42.

As best shown in Figures 1, 3 and 5, the base 24 is provided with a horizontal rock-shaft 45 extending across the axial bore 26. A lever arm 46 non-rotatably carried by the rock-shaft 45 is connected by the link or rod 47, similar to the rods 33 and 39, and extends downwardly through the table 20 and therebelow where it is operatively connected to the treadle 34. A tension spring 48 connected to the table 20 and to the treadle 34 is provided to maintain the position of the treadle and its operatively related parts. A pair of stop studs 49 and 50 are rigidly carried by the base 24 to limit movement of the arm 46 in two directions. The normal position of the lever 46 is against the upper stop 49.

The shaft 45 carries non-rotatably thereon within the walls of the axial bore 26 a cam member 51 formed substantially semi-circular in shape with an upper flat surface 52 and a curved surface 53. As best shown in Figure 3, the flat surface 52 joins the curved surface 53 in a continuous short curve of generation at each end, providing a smooth working cam for a purpose to appear presently.

The base 24 carries for reciprocation in the axial bore 26 a reciprocating member or piston 54 which has diametrically opposite sides of its skirt bifurcated for the purpose of fitting over the rock-shaft 45. The piston is hollowed, as shown, and the under side of the head normally rests on the flat surface 52 of the cam 51. The piston carries rigidly secured thereto a ball injecting member or injector 55, which, as best shown in Figure 6, is formed with a flat base portion 56 and an upstanding arcuate portion 57. This arcuate portion 57, as best shown in Figures 7, 8 and 9, has a tail portion 57' similar to the tail portion 36' in the arcuate opening 36 and is adapted to cooperate with the arcuate opening 36 in the plate 25. As shown in Figures 3, 5 and 7, the normal position of the top of the injector 55 is slightly above the bottom of the plate 25 and substantially in alignment with the bottom of the ball supplying bore or passage 37.

The injector 55 is secured to the piston 54 by a locating pin and a countersunk stud, as shown, to form means for introducing balls through the opening 36 and between the race rings 27 and 28.

The cam 51, as shown in Figures 3 and 5, carries on either side, in a predetermined position, a block 58 for a purpose to appear later. The cam 51, and blocks 58 mounted thereon, provides with the rock-shaft 45 a rotatable member or means mounted for reciprocation in the race ring supporting means.

As best shown in Figures 2, 3, 4, 6, 7, 8 and 9, the arcuate portion 57 of the injector 55 is provided with a pair of angularly spaced notches 59. As previously mentioned, the means provided in the present disclosure of the invention are adapted to bearings of a certain size and to a certain predetermined number of balls of a certain size. The radial width of the arcuate opening 36 is substantially equal to the diameter of one of the balls for which the machine is adapted. The radial width of the arcuate portion 57 of the injector 55 is slightly less than the radial width of the arcuate opening 36 to insure a nice fit therebetween. For the same reason and purpose each of the notches 59 is of a size sufficient to accommodate a ball of the size used in assembling the bearing. The length of the arcuate opening 36 is governed by the number of balls to be introduced between the race rings of the bearing. In the case of the present invention the arcuate opening 36 is as long as the total number of balls required minus two, each notch being adapted to retain a ball.

Centrally of each notch 59 is a vertical bore 60 with an enlarged portion below the bottom of each notch, as shown. Each bore carries slidably therein a headed injector pin or rod 61. The pins 61 extend downwardly through the injector and through bores in the piston 54 on each side of the cam 51 and into close proximity to the blocks 58 on the cam. The blocks are adapted to engage the pins 60 upon rotation of the cam 51 in the direction of the arrow in Figure 3.

Thus it is apparent that means has been provided for introducing additional balls between the race rings 27 and 28, and that the means is adapted to be actuated by the rotatable means carried by the base 24.

In the operation of the machine a pair of race rings, inner and outer, are placed on the supporting means or the top of the plate 25, as shown in Figures 2, 10 and 11, with the outer race 28 abutting the abutment 29 and contacted diametrically opposite by the resilient member 35. The inner race 27 is positioned eccentrically within the outer race 28 and tangent thereto at a point lying on the diameter of the outer race ring 28 that intersects the points of tangency of the abutment 29 and the resilient member 35. In this position the space between the race rings is substantially in alignment with the arcuate openings 36.

As best shown in Figures 3 and 5, the arcuate portion 57 of the injector 55 is normally within the lower portion of the opening 36. As the treadle 34 is pressed downward, a predetermined number of balls (in the case of the present embodiment of the invention and the particular type of bearing to be assembled as disclosed and illustrated, nine balls are used) have been supplied to the arcuate opening 36. The balls pass below the resilient ball retaining means 40 and are cut off or retained and prevented thereby from piling up on top of the arcuate portion 57 of the injector 55.

In the case of the present embodiment of the invention in which nine balls are required, the first two balls to enter the arcuate opening 36 drop into the notches 59 in the injector 55, the remainder of the balls resting on the top of the arcuate portion 57 of the injector and on top of the first two balls (Figure 7).

As the treadle 34 is further pressed downward the rock-shaft 45 is actuated by means of the link 47 and the lever arm 46 is rotated in the direction of the arrow in Figure 3; the reciprocating means or member or piston 54 and injector 55 are thus actuated and raised upward; and, the balls on the top of the arcuate portion 57 of the injector 55 are introduced between the race rings 27 and 28 into the space therebetween and above the arcuate opening 36 (Figure 8).

Also, as the treadle 34 is further pressed down the screw 31 is rotated by means of the rod 33 and the lever arm 34 and acts to engage the resilient member 35 and to compress the outer race ring 28 diametrically between the screw 31 and the resilient member 35 and the abutment 29, thus temporarily distorting the circular race ring 28 into substantially an ellipse, as best shown in Figure 11. It is apparent from an examination of this figure that the space between the rings is increased at substantially diametrically opposed portions and at right angles to the line of compression. Before distortion of the outer race ring 28 (Figures 2 and 9) there was not sufficient space between the rings for more than a certain number of balls—in the present disclosure, seven.

Simultaneously, as the outer race ring is being temporarily distorted, the blocks 58 on the cam 51 are approaching the lower ends of the headed injector rods 61; and, as the outer race ring is sufficiently distorted, the blocks 58, because of continued rotation of the cam 51 and continued pressure on the treadle 34, engage the headed rods 61 and drive them upward. The rods engage the balls in the notches 59 of the injector 55 and raise them upward, introducing them between the races 27 and 28 and into the space now ready to accommodate them (Figures 9 and 11). The tail portions 36' and 57' because of their shape and position give support to the end balls and allow for quick and easy introduction of the two additional balls.

The required number of balls now being between the race rings, pressure on the treadle 34 is released and the treadle is drawn back to normal position by the tension spring 48. Compression on the race ring 28 is removed and the balls are easily accommodated by the race rings as they are forced into the raceways of the rings by returning the inner race ring 27 to a position concentric with the outer race 28.

It is apparent from an examination of Figures 3 and 4, that the resilient ball retaining means 41, 40 and 42 may be easily urged outwardly as the balls are being elevated by the ball introducing means, and that these means serve to maintain the positions of the balls and also serve as a means to cut off or retain the supply of balls from the bore 37 to the arcuate opening. Only a predetermined number of balls may enter the arcuate opening 36, any more being prevented from doing so by virtue of the partial projection of the resilient ball retaining means into the opening. As the injector 55 and piston 54 are raised past the bore 37, the bore is cut off from communication with the arcuate opening and remains cut off until the injector and piston are returned to their original position. Because of the pressure or weight of the balls in the conduit 23, more balls enter the arcuate opening each time the piston and injector are at bottom position, the number of balls each time being kept constant by the ball retaining means.

The stops 49 and 50 further aid in controlling the number of balls to enter the arcuate opening inasmuch as they allow only a limited movement of the lever arm 46 on the rock-shaft 45 and prevent excessive movement of the cam 51, piston 54 and injector 55.

From the above description and disclosure it will be apparent that new and novel means have been provided for loading balls into bearings; and, it will be further apparent that although only one of many preferred types of the invention is shown and illustrated, numerous similar machines or alterations of the present machine may be employed without sacrificing a great deal of the desirable features present in and results obtainable from the machine and means as disclosed and hereinafter claimed.

What is claimed as new is:

1. In a machine for introducing balls between the race rings of a bearing, the combination of means for supporting the race rings in substantially the same plane with one race ring positioned eccentrically within the other race ring, said means being provided with an opening therein, an abutment on the supporting means against which one of the race rings is adapted to be placed, means movably carried by the supporting means and cooperating with the abutment for compressing said race ring therebetween, means for supplying balls to the opening, a second means movably carried by the supporting means, a third means movably carried by the supporting means and cooperating with the second movable means for introducing balls through the opening and between the race rings, and actuating means for operating the ball supplying means, the compressing means, and the ball introducing means.

2. In a machine for introducing balls between the inner and outer race rings of a bearing, the combination of means for supporting the race rings in substantially the same plane with the inner race ring positioned eccentrically within the outer race ring, said means being provided with an opening therein and with a passage communicating with said opening, an abutment on the supporting means against which the outer ring is adapted to be placed, means movably carried by the supporting means and cooperating with the abutment for compressing the outer race ring therebetween, means for supplying balls through the passage in the supporting means to the opening therein, a second means movably carried by the supporting means and cooperating with the opening therein for retaining the balls, a third means movably carried by the supporting means and cooperating with the second movable means for introducing the retained balls between the race rings, and actuating means for operating the ball supplying means, the compressing means, and the ball introducing means.

3. In a machine for introducing balls between the inner and outer race rings of a bearing, the combination of a fixture for supporting the race rings in substantially the same plane with the inner race ring arranged eccentrically within the outer race ring, said fixture being provided with a substantially arcuate opening therein and with a passage communicating with said opening, an abutment on the fixture against which the periphery of the outer race ring may be placed, means movably carried by the fixture and cooperating with the abutment for compressing the outer ring therebetween, a conduit for supplying balls through the passage in the fixture to the arcuate opening therein, means carried by the fixture for reciprocation therein, said means cooperating with the arcuate opening for retaining the balls temporarily therein, means rotatably carried by the fixture and cooperating with the reciprocating means for introducing the retained balls between the race rings, and means for operating the compression means and the ball introducing means.

4. In a machine for introducing balls between the inner and outer race rings of a bearing, the combination of means for supporting the race rings in substantially the same plane with the inner race ring positioned eccentrically within the outer race ring, said means being provided with a substantially arcuate opening therein and with a passage communicating with said opening, an abutment on the supporting means against which the outer race ring is placed, means movably carried by the supporting means and cooperating with the abutment for compressing the outer race ring therebetween, means for supplying balls through the passage in the supporting means to the arcuate opening therein, means slidably carried by the supporting means and cooperating with the arcuate opening for retaining the balls therein, means rotatably carried by the supporting means and cooperating with the slidable means for introducing the retained balls between the race rings, and actuating means for operating the ball supplying means, the compressing means, and the ball introducing means.

5. In a machine for introducing balls between the inner and outer race rings of a bearing, the combination of means for supporting the race rings in substantially the same plane with the inner race ring positioned eccentrically within the outer race ring, said means being provided with a substantially arcuate opening therein and with a passage communicating with said opening, resilient means carried in the supporting means and entering said arcuate opening, an abutment on the supporting means against which the outer race ring is adapted to be placed, a second means movably carried by the supporting means and cooperating with the abutment for compressing the outer race ring therebetween, means for supplying balls through the passage in the supporting means to the arcuate opening therein, means slidably carried by the supporting means and cooperating with the arcuate opening and the resilient means for retaining the balls therein, means rotatably carried by the supporting means and cooperating with the slidable means for introducing the retained balls between the race rings, and actuating means for operating the ball supplying means, the compressing means, and the ball introducing means.

6. In a machine for introducing balls between the race rings of a bearing, the combination of a supporting member provided with an opening therethrough for receiving balls, said member being adapted to support the race rings with the inner race ring positioned eccentrically within the outer end and with the space therebetween substantially in alignment with the opening, a reciprocating member cooperating with said opening for introducing balls therethrough and between the race rings, and means for temporarily distorting one of the race rings to permit the introduction of additional balls thereto.

7. In a machine for introducing balls between the race rings of a bearing, the combination of a supporting member provided with an opening therethrough for receiving balls, said member being adapted to support the race rings with the inner race ring positioned eccentrically within the outer and with the space therebetween substantially in alignment with the opening, a reciprocating member cooperating with said opening for introducing balls therethrough and between the race rings, means for temporarily distorting the outer race ring, and means cooperating with the reciprocating member for introducing additional balls between the race rings while said outer race ring is temporarily distorted.

8. In a machine for introducing balls between the race rings of a bearing, the combination of a supporting member provided with an opening therethrough for receiving balls, said member being adapted to support the race rings with the inner race ring positioned eccentrically within the outer and with the space therebetween substantially in alignment with the opening, a reciprocating member cooperating with said opening, a rotatable member cooperating with the reciprocating member for actuation thereof to introduce balls through the opening and between the rings, means for temporarily distorting the outer race rings, and means associated with the reciprocating member and actuated by the rotatable member for introducing additional balls between the race rings while said outer race ring is temporarily distorted.

9. In a machine for introducing balls between the race rings of a bearing, the combination of a base provided with an axial bore, a plate carried by the base and provided with an opening therethrough for receiving balls, said opening communicating with said axial bore, said plate being adapted to support the race rings with the inner ring eccentrically positioned within the outer and with the space therebetween substantially in alignment with the opening in the plate, resilient ball retaining means carried by the plate and cooperating with the ball receiving opening, means on the plate for temporarily distorting the outer race ring, and a reciprocating member carried by the base in the axial bore for introducing balls through the opening and between the race rings.

10. In a machine for introducing balls between the race rings of a bearing, the combination of a base provided with an axial bore, a plate carried by the base and provided with an opening therethrough for receiving balls, said opening communicating with said axial bore, said plate being adapted to support the race rings with the inner ring eccentrically positioned within the outer and with the space therebetween substantially in alignment with the opening in the plate, means on the plate for temporarily distorting the outer race ring, and a reciprocating member carried by the base in the axial bore for introducing balls through the opening and between the race rings.

11. In a machine for introducing balls between the race rings of a bearing, the combination of a base provided with an axial bore, a plate carried by the base and provided with an opening therethrough for receiving balls, said opening communicating with said axial bore, said plate being adapted to support the race rings with the inner ring eccentrically positioned within the outer and with the space therebetween substantially in alignment with the opening in the plate, resilient ball retaining means carried by the plate and cooperating with the ball receiving opening, a reciprocating member carried by the base for introducing balls through the opening and between the race rings, means on the plate for temporarily distorting the outer race ring, and means on the reciprocating member for introducing additional balls between the race rings while said outer race ring is temporarily distorted.

12. In a fixture for assembling ball bearings having an outer and inner race ring, said fixture comprising a substantially horizontal support including an abutment against which the outer race ring is placed, the inner race ring being placed eccentrically within the outer race ring, means to temporarily distort the outer race ring, a magazine containing a supply of balls located at a point above the support, and means below the support receiving balls from said magazine for introducing a predetermined number of balls into the space between the rings in a direction parallel to the axes of the race rings on the support.

13. In a fixture for assembling ball bearings having an outer and inner race ring, said fixture comprising a substantially horizontal support including an abutment against which the outer race ring is placed, the inner race ring being placed eccentrically within the outer race ring, means to temporarily distort the outer race ring, a magazine containing a supply of balls located at a point above the support, means below the support receiving balls from said magazine for introducing a predetermined number of balls into the space between the race ring, and means for introducing a predetermined number of additional balls into said space while the outer race ring is temporarily distorted.

14. In a machine for assembling a ball bearing having an inner and an outer race ring and a predetermined number of balls, the combination of a support having a substantially flat top face and provided with an arcuate pocket adapted to retain less than the aforesaid predetermined number of balls, said support being adapted to support the race rings in substantially the same horizontal plane with the inner race ring eccentrically disposed within the outer ring and with the space of greatest width between the rings being located substantially above the arcuate opening, means for compressing said outer race ring to temporarily increase the width of said space at certain points, ball introducing means movably associated with the support and cooperating with the arcuate opening for introducing said retained balls upwardly into said space, said means being adapted to retain an additional number of balls equal to the predetermined number of balls minus the balls retained in the arcuate opening, and a second ball introducing means associated with the first ball introducing means for introducing said additional number of balls into said space to complete the assembly.

15. In a machine for assembling a ball bearing having an inner and an outer race ring and a predetermined number of balls, the combination of a support having a substantially flat top face, said support being provided with an arcuate opening adapted to retain less than the predetermined number of balls, said support being also adapted to support the race rings with the inner ring eccentrically disposed within the outer ring with the space of greatest width between the rings disposed over the arcuate opening, a member adapted to reciprocate in the arcuate opening and formed with a pocket adapted to retain an additional number of balls equal to the predetermined number of balls minus the balls retained in the arcuate opening, means for compressing one of the rings for temporarily increasing the width of the space between the rings at certain points, means for reciprocating the aforesaid member to introduce the retained balls upwardly through the arcuate opening into said space, and means for introducing said additional balls similarly.

16. In a machine for assembling a ball bearing having an inner and an outer race ring and a predetermined number of balls, the combination of a support provided with an arcuate opening, said race rings being disposed on said support with the inner ring disposed eccentrically within the outer race ring with the space of greatest width therebetween positioned over the arcuate opening, an arcuate member adapted to reciprocate in said arcuate opening and having a pocket formed therein of a size to accommodate at least one ball, means for supplying a predetermined number of balls to the arcuate opening and to the pocket, at least one of the balls falling into said pocket and the other balls being retained by the arcuate opening and supported above and by the arcuate member and the ball in the pocket, means compressing one of the race rings to temporarily increase the width of the space between the rings at certain points, means for moving the arcuate member upwardly to introduce the uppermost balls into the space between the rings, and means movable upwardly with respect to the arcuate member for introducing the remaining number of balls into said space.

17. In a machine for assembling a ball bearing having an inner and an outer race ring and a predetermined number of balls, the combination of a fixture provided with an opening, movable means cooperating with the opening and adapted to retain said balls in a series of layers, said race rings being supported by the fixture in substantially the same plane with the inner ring disposed eccentrically within the outer and with the greatest space therebetween disposed in alignment with the aforesaid opening, means for compressing one of the race rings to temporarily increase the width of said space at certain points, and means for actuating said first means to introduce successive layers of balls through the opening and freely into said space between the rings.

18. In a machine for assembling a ball bearing having an inner and an outer race ring and a predetermined number of balls, the combination of a support having a substantially flat top face, said support being provided with an arcuate opening adapted to retain less than the predetermined number of balls, said support being adapted to support the race rings with the inner ring eccentrically disposed within the outer ring with the space of greatest width between the rings disposed over the arcuate opening, a member adapted to reciprocate in the arcuate opening and formed with a pocket adapted to retain an additional number of balls equal to the predetermined number of balls minus the balls retained in the arcuate opening, means for reciprocating the aforesaid member to introduce the retained balls upwardly through the arcuate opening into said space, and means adapted to reciprocate with respect to said member for introducing said additional balls upwardly through the arcuate opening and freely between the race rings.

19. In a machine for assembling a ball bearing having an inner and an outer race ring and a plurality of balls, the combination of means for supporting said race rings in a substantially horizontal plane with the inner ring disposed eccentrically within the outer ring and forming a space therebetween, means for temporarily retaining balls below the rings, and means mounted for vertical movement with respect to the supporting means for engaging the retained balls to introduce them upwardly into the space between the rings.

20. In a machine for assembling a ball bearing having an inner and an outer race ring and a plurality of balls, the combination of means for supporting said race rings in a substantially horizontal plane with the inner ring disposed eccentrically within the outer ring and forming a space therebetween, means disposed below the race rings for temporarily retaining balls, means mounted for vertical movement with respect to the supporting means for engaging the retained balls to move them upwardly between the race rings, said last named means being adapted to retain an additional number of balls, and means movably associated with said means for engaging said additional balls to move them also upwardly between the rings.

PHILIP C. BOOTY, Jr.